US010440790B2

(12) United States Patent
Dunn et al.

(10) Patent No.: US 10,440,790 B2
(45) Date of Patent: Oct. 8, 2019

(54) ELECTRONIC DISPLAY SYSTEM WITH ILLUMINATION CONTROL

(71) Applicant: Manufacturing Resources International, Inc., Alpharetta, GA (US)

(72) Inventors: William Dunn, Alpharetta, GA (US); John Schuch, Buford, GA (US); David Williams, Canton, GA (US)

(73) Assignee: Manufacturing Resources International, Inc., Alpharetta, GA (US)

( * ) Notice: Subject to any disclaimer, the term of this patent is extended or adjusted under 35 U.S.C. 154(b) by 85 days.

(21) Appl. No.: 15/863,262

(22) Filed: Jan. 5, 2018

(65) Prior Publication Data

US 2018/0132327 A1  May 10, 2018

Related U.S. Application Data

(63) Continuation of application No. 14/884,479, filed on Oct. 15, 2015, now Pat. No. 9,867,253, which is a (Continued)

(51) Int. Cl.
*H05B 33/08* (2006.01)
*H05B 37/02* (2006.01)
*G09G 3/36* (2006.01)

(52) U.S. Cl.
CPC .......... *H05B 33/0854* (2013.01); *G09G 3/36* (2013.01); *H05B 33/0848* (2013.01); (Continued)

(58) Field of Classification Search
CPC ................ H05B 33/08; H05B 33/0842; H05B 33/0845; H05B 33/0848; H05B 33/0851; (Continued)

(56) References Cited

U.S. PATENT DOCUMENTS

| 4,093,355 A | 6/1978 | Kaplit et al. |
| 4,593,978 A | 6/1986 | Mourey et al. |

(Continued)

FOREIGN PATENT DOCUMENTS

| AU | 2010218083 B2 | 10/2016 |
| AU | 2016203550 B2 | 3/2018 |

(Continued)

OTHER PUBLICATIONS

Novitsky, T. et al., Design How-To, Driving LEDs versus CCFLs for LCD backlighting, EE Times, Nov. 12, 2007, 6 pages, AspenCore.

(Continued)

*Primary Examiner* — Jimmy T Vu
(74) *Attorney, Agent, or Firm* — Standley Law Group LLP; Jeffrey S. Standley; Eric M. Gayan

(57) ABSTRACT

An electronic display system having an electronic display with illumination control, wherein illumination control may be based on one or both of the system operating temperature and a light ratio defined as the ratio of ambient light to light emitted by an illumination means of the electronic display. When adjusting the emitted light level of the illumination means, some exemplary system embodiments may consider temperature only, some embodiments may consider light ratio only, and some embodiments may consider both temperature and light ratio. Sensors may be provided to measure system operating temperature, as well as ambient light level and illumination means light output. Illumination control is provided by using a controller to adjust the output of a power source that supplies electrical energy to the illumination means if the temperature and/or light ratio falls outside of an acceptable range.

20 Claims, 6 Drawing Sheets

Related U.S. Application Data continuation of application No. 14/709,045, filed on May 11, 2015, now Pat. No. 9,167,655, which is a continuation of application No. 14/447,164, filed on Jul. 30, 2014, now Pat. No. 9,030,129, which is a continuation of application No. 13/353,371, filed on Jan. 19, 2012, now Pat. No. 8,829,815, which is a continuation of application No. 12/124,741, filed on May 21, 2008, now Pat. No. 8,125,163.

(52) U.S. Cl.
CPC ..... *H05B 33/0851* (2013.01); *H05B 33/0872* (2013.01); *H05B 37/02* (2013.01); *H05B 37/0218* (2013.01); *H05B 37/0227* (2013.01); *G09G 2320/041* (2013.01); *G09G 2330/021* (2013.01)

(58) Field of Classification Search
CPC ............ H05B 33/0854; H05B 33/0872; H05B 37/02; H05B 37/0218; H05B 37/0227; H05B 37/0272; G09G 3/36; G09G 2320/041; G09G 2330/021
See application file for complete search history.

(56) References Cited

U.S. PATENT DOCUMENTS

| | | | |
|---|---|---|---|
| 4,634,225 | A | 1/1987 | Haim et al. |
| 5,029,982 | A | 7/1991 | Nash |
| 5,086,314 | A | 2/1992 | Aoki et al. |
| 5,088,806 | A | 2/1992 | McCartney et al. |
| 5,162,785 | A | 11/1992 | Fagard |
| 5,247,374 | A | 9/1993 | Terada |
| 5,559,614 | A | 9/1996 | Urbish et al. |
| 5,661,374 | A | 8/1997 | Cassidy et al. |
| 5,748,269 | A | 5/1998 | Harris et al. |
| 5,767,489 | A | 6/1998 | Ferrier |
| 5,783,909 | A | 7/1998 | Hochstein |
| 5,786,801 | A | 7/1998 | Ichise |
| 5,808,418 | A | 9/1998 | Pitman et al. |
| 5,818,010 | A | 10/1998 | McCann |
| 5,952,992 | A | 9/1999 | Helms |
| 5,991,153 | A | 11/1999 | Heady et al. |
| 6,089,751 | A | 7/2000 | Conover et al. |
| 6,144,359 | A | 11/2000 | Grave |
| 6,153,985 | A | 11/2000 | Grossman |
| 6,157,143 | A | 12/2000 | Bigio et al. |
| 6,157,432 | A | 12/2000 | Helbing |
| 6,181,070 | B1 | 1/2001 | Dunn et al. |
| 6,191,839 | B1 | 2/2001 | Briley et al. |
| 6,259,492 | B1 | 7/2001 | Imoto et al. |
| 6,292,228 | B1 | 9/2001 | Cho |
| 6,297,859 | B1 | 10/2001 | George |
| 6,380,853 | B1 | 4/2002 | Long et al. |
| 6,388,388 | B1 | 5/2002 | Weindorf et al. |
| 6,400,101 | B1 | 6/2002 | Biebl et al. |
| 6,417,900 | B1 | 7/2002 | Shin et al. |
| 6,496,236 | B1 | 12/2002 | Cole et al. |
| 6,509,911 | B1 | 1/2003 | Shimotono |
| 6,535,266 | B1 | 3/2003 | Nemeth et al. |
| 6,556,258 | B1 | 4/2003 | Yoshida et al. |
| 6,628,355 | B1 | 9/2003 | Takahara |
| 6,712,046 | B2 | 3/2004 | Nakamichi |
| 6,753,661 | B2 * | 6/2004 | Muthu ................ G09G 3/3413 315/149 |
| 6,753,842 | B1 | 6/2004 | Williams et al. |
| 6,762,741 | B2 | 7/2004 | Weindorf |
| 6,798,341 | B1 | 9/2004 | Eckel et al. |
| 6,809,718 | B2 | 10/2004 | Wei et al. |
| 6,812,851 | B1 | 11/2004 | Dukach et al. |
| 6,813,375 | B2 | 11/2004 | Armato, III et al. |
| 6,839,104 | B2 | 1/2005 | Taniguchi et al. |
| 6,850,209 | B2 | 2/2005 | Mankins et al. |
| 6,885,412 | B2 | 4/2005 | Ohnishi et al. |
| 6,886,942 | B2 | 5/2005 | Okada et al. |
| 6,891,135 | B2 | 5/2005 | Pala et al. |
| 6,943,768 | B2 | 9/2005 | Cavanaugh et al. |
| 6,982,686 | B2 | 1/2006 | Miyachi et al. |
| 6,996,460 | B1 | 2/2006 | Krahnstoever et al. |
| 7,015,470 | B2 | 3/2006 | Faytlin et al. |
| 7,038,186 | B2 | 5/2006 | De Brabander et al. |
| 7,064,733 | B2 | 6/2006 | Cok et al. |
| 7,083,285 | B2 | 8/2006 | Hsu et al. |
| 7,136,076 | B2 | 11/2006 | Evanicky et al. |
| 7,174,029 | B2 | 2/2007 | Agostinelli et al. |
| 7,176,640 | B2 * | 2/2007 | Tagawa ................ G09G 3/3413 315/308 |
| 7,236,154 | B1 | 6/2007 | Kerr et al. |
| 7,307,614 | B2 | 12/2007 | Vinn |
| 7,324,080 | B1 | 1/2008 | Hu et al. |
| 7,330,002 | B2 | 2/2008 | Joung |
| 7,354,159 | B2 | 4/2008 | Nakamura et al. |
| 7,474,294 | B2 | 1/2009 | Leo et al. |
| 7,480,042 | B1 | 1/2009 | Phillips et al. |
| 7,518,600 | B2 | 4/2009 | Lee |
| 7,595,785 | B2 | 9/2009 | Jang |
| 7,639,220 | B2 | 12/2009 | Yoshida et al. |
| 7,659,676 | B2 | 2/2010 | Hwang |
| 7,692,621 | B2 | 4/2010 | Song |
| 7,724,247 | B2 | 5/2010 | Yamazaki et al. |
| 7,795,574 | B2 | 9/2010 | Kennedy et al. |
| 7,795,821 | B2 | 9/2010 | Jun |
| 7,800,706 | B2 | 9/2010 | Kim et al. |
| 7,804,477 | B2 | 9/2010 | Sawada et al. |
| 7,982,706 | B2 | 7/2011 | Ichikawa et al. |
| 8,087,787 | B2 | 1/2012 | Medin |
| 8,111,371 | B2 | 2/2012 | Suminoe et al. |
| 8,125,163 | B2 | 2/2012 | Dunn et al. |
| 8,144,110 | B2 | 3/2012 | Huang |
| 8,175,841 | B2 | 5/2012 | Ooghe |
| 8,194,031 | B2 | 6/2012 | Yao et al. |
| 8,248,203 | B2 | 8/2012 | Hanwright et al. |
| 8,352,758 | B2 | 1/2013 | Atkins et al. |
| 8,508,155 | B2 | 8/2013 | Schuch |
| 8,569,910 | B2 | 10/2013 | Dunn et al. |
| 8,605,121 | B2 | 12/2013 | Chu et al. |
| 8,700,226 | B2 | 4/2014 | Schuch et al. |
| 8,797,372 | B2 | 8/2014 | Liu |
| 8,810,501 | B2 | 8/2014 | Budzelaar et al. |
| 8,823,630 | B2 | 9/2014 | Roberts et al. |
| 8,829,815 | B2 | 9/2014 | Dunn et al. |
| 8,895,836 | B2 | 11/2014 | Amin et al. |
| 8,901,825 | B2 | 12/2014 | Reed |
| 8,982,013 | B2 | 3/2015 | Sako et al. |
| 8,983,385 | B2 | 3/2015 | Macholz |
| 8,988,011 | B2 | 3/2015 | Dunn |
| 9,030,129 | B2 | 5/2015 | Dunn et al. |
| 9,167,655 | B2 | 10/2015 | Dunn et al. |
| 9,286,020 | B2 | 3/2016 | Dunn et al. |
| 9,448,569 | B2 | 9/2016 | Schuch et al. |
| 9,451,060 | B1 | 9/2016 | Bowers et al. |
| 9,516,485 | B1 | 12/2016 | Bowers et al. |
| 9,536,325 | B2 | 1/2017 | Bray et al. |
| 9,622,392 | B1 | 4/2017 | Bowers et al. |
| 9,799,306 | B2 | 10/2017 | Dunn et al. |
| 9,867,253 | B2 | 1/2018 | Dunn et al. |
| 9,924,583 | B2 | 3/2018 | Schuch et al. |
| 2002/0020090 | A1 | 2/2002 | Sanders |
| 2002/0050974 | A1 | 5/2002 | Rai et al. |
| 2002/0101553 | A1 | 8/2002 | Enomoto et al. |
| 2002/0112026 | A1 | 8/2002 | Fridman et al. |
| 2002/0126248 | A1 | 9/2002 | Yoshida |
| 2002/0154138 | A1 | 10/2002 | Wada et al. |
| 2002/0164962 | A1 | 11/2002 | Mankins et al. |
| 2002/0167637 | A1 | 11/2002 | Burke et al. |
| 2002/0190972 | A1 | 12/2002 | Ven de Van |
| 2003/0007109 | A1 | 1/2003 | Park |
| 2003/0088832 | A1 | 5/2003 | Agostinelli et al. |
| 2003/0204342 | A1 | 10/2003 | Law et al. |
| 2003/0214242 | A1 | 11/2003 | Berg-johansen |
| 2003/0230991 | A1 | 12/2003 | Muthu et al. |
| 2004/0032382 | A1 | 2/2004 | Cok et al. |

(56) References Cited

U.S. PATENT DOCUMENTS

| | | |
|---|---|---|
| 2004/0036697 A1 | 2/2004 | Kim et al. |
| 2004/0036834 A1 | 2/2004 | Ohnishi et al. |
| 2004/0113044 A1 | 6/2004 | Ishiguchi |
| 2004/0165139 A1 | 8/2004 | Anderson et al. |
| 2004/0243940 A1 | 12/2004 | Lee et al. |
| 2005/0012734 A1 | 1/2005 | Johnson et al. |
| 2005/0043907 A1 | 2/2005 | Eckel et al. |
| 2005/0049729 A1 | 3/2005 | Culbert et al. |
| 2005/0073518 A1 | 4/2005 | Bontempi |
| 2005/0094391 A1 | 5/2005 | Campbell et al. |
| 2005/0127796 A1 | 6/2005 | Olesen et al. |
| 2005/0140640 A1 | 6/2005 | Oh et al. |
| 2005/0184983 A1 | 8/2005 | Brabander et al. |
| 2005/0231457 A1 | 10/2005 | Yamamoto et al. |
| 2005/0242741 A1 | 11/2005 | Shiota |
| 2006/0007107 A1 | 1/2006 | Ferguson |
| 2006/0022616 A1 | 2/2006 | Furukawa et al. |
| 2006/0038511 A1 | 2/2006 | Tagawa |
| 2006/0049533 A1 | 3/2006 | Kamoshita |
| 2006/0087521 A1 | 4/2006 | Chu et al. |
| 2006/0125773 A1 | 6/2006 | Ichikawa et al. |
| 2006/0130501 A1 | 6/2006 | Singh et al. |
| 2006/0197474 A1 | 9/2006 | Olsen |
| 2006/0197735 A1 | 9/2006 | Vuong et al. |
| 2006/0214904 A1 | 9/2006 | Kimura et al. |
| 2006/0215044 A1 | 9/2006 | Masuda et al. |
| 2006/0220571 A1 | 10/2006 | Howell et al. |
| 2006/0238531 A1 | 10/2006 | Wang |
| 2006/0244702 A1 | 11/2006 | Yamazaki et al. |
| 2007/0013828 A1 | 1/2007 | Cho et al. |
| 2007/0047808 A1 | 3/2007 | Choe et al. |
| 2007/0152949 A1 | 7/2007 | Sakai |
| 2007/0171647 A1 | 7/2007 | Artwohl et al. |
| 2007/0173297 A1 | 7/2007 | Cho et al. |
| 2007/0200513 A1 | 8/2007 | Ha et al. |
| 2007/0222730 A1 | 9/2007 | Kao et al. |
| 2007/0230167 A1 | 10/2007 | McMahon et al. |
| 2007/0242153 A1 | 10/2007 | Tang et al. |
| 2007/0247594 A1 | 10/2007 | Tanaka |
| 2007/0268234 A1 | 11/2007 | Wakabayashi et al. |
| 2007/0268241 A1 | 11/2007 | Nitta et al. |
| 2007/0273624 A1 | 11/2007 | Geelen |
| 2007/0279369 A1 | 12/2007 | Yao et al. |
| 2007/0291198 A1 | 12/2007 | Shen |
| 2007/0297163 A1 | 12/2007 | Kim et al. |
| 2007/0297172 A1 | 12/2007 | Furukawa et al. |
| 2008/0019147 A1 | 1/2008 | Erchak et al. |
| 2008/0055297 A1 | 3/2008 | Park |
| 2008/0074382 A1 | 3/2008 | Lee et al. |
| 2008/0078921 A1 | 4/2008 | Yang et al. |
| 2008/0084166 A1 | 4/2008 | Tsai |
| 2008/0111958 A1 | 5/2008 | Kleverman et al. |
| 2010/0039414 A1 | 2/2010 | Bell |

FOREIGN PATENT DOCUMENTS

| | | |
|---|---|---|
| CA | 2754371 C | 11/2017 |
| EP | 0313331 B1 | 2/1994 |
| EP | 2299723 A1 | 3/2011 |
| EP | 2401738 A2 | 1/2012 |
| EP | 2577389 A2 | 4/2013 |
| EP | 2769376 A1 | 8/2014 |
| EP | 3295452 A1 | 3/2018 |
| EP | 2401738 B1 | 5/2018 |
| GB | 2369730 A | 5/2002 |
| JP | 3-153212 A | 7/1991 |
| JP | 8193727 A | 7/1996 |
| JP | 11-160727 A | 6/1999 |
| JP | 2000122575 A | 4/2000 |
| JP | 2004325629 A | 11/2004 |
| JP | 2005265922 A | 9/2005 |
| JP | 2006-145890 A | 6/2006 |
| JP | 2006318733 A | 11/2006 |
| JP | 2007003638 A | 1/2007 |
| JP | 2007322718 A | 12/2007 |
| JP | 2008-34841 A | 2/2008 |
| JP | 2008122695 A | 5/2008 |
| JP | 2009031622 A | 2/2009 |
| JP | 2010-282109 A | 12/2010 |
| KR | 10-2006-0016469 A | 2/2006 |
| KR | 10-2008-0000144 A | 1/2008 |
| KR | 10-2008-0013592 A | 2/2008 |
| KR | 10-2008-0086245 A | 9/2008 |
| KR | 10-2011-0125249 A | 11/2011 |
| KR | 10-1759265 B1 | 7/2017 |
| WO | 2008/050402 A1 | 5/2008 |
| WO | 2010/141739 A2 | 12/2010 |
| WO | 2011/052331 A1 | 5/2011 |
| WO | 2011/130461 A2 | 10/2011 |
| WO | 2011/150078 A2 | 12/2011 |
| WO | 2013/044245 A1 | 3/2013 |
| WO | 2016/183576 A1 | 11/2016 |
| WO | 2017/031237 A1 | 2/2017 |
| WO | 2017/210317 A1 | 12/2017 |
| WO | 2018/009917 A1 | 1/2018 |

OTHER PUBLICATIONS

Vogler, A. et al., Photochemistry and Beer, Journal of Chemical Education, Jan. 1982, pp. 25-27, vol. 59, No. 1.

Zeef, Hubing, EMC analysis of 18' LCD Monitor, Aug. 2000, 1 page.

* cited by examiner

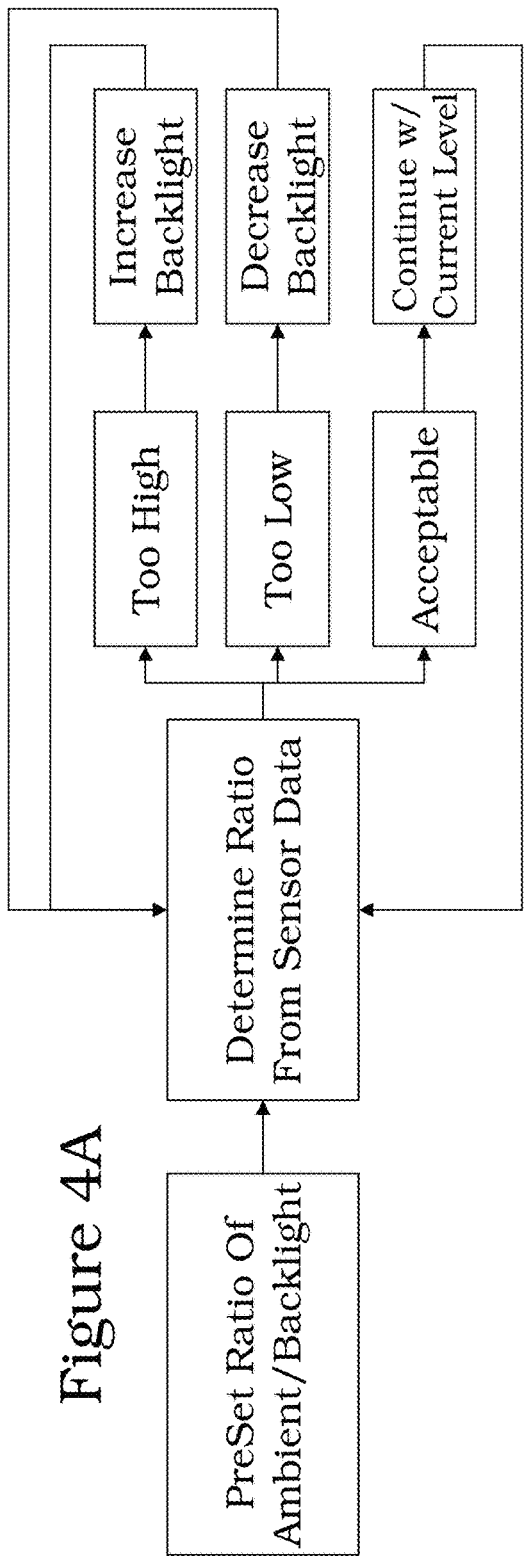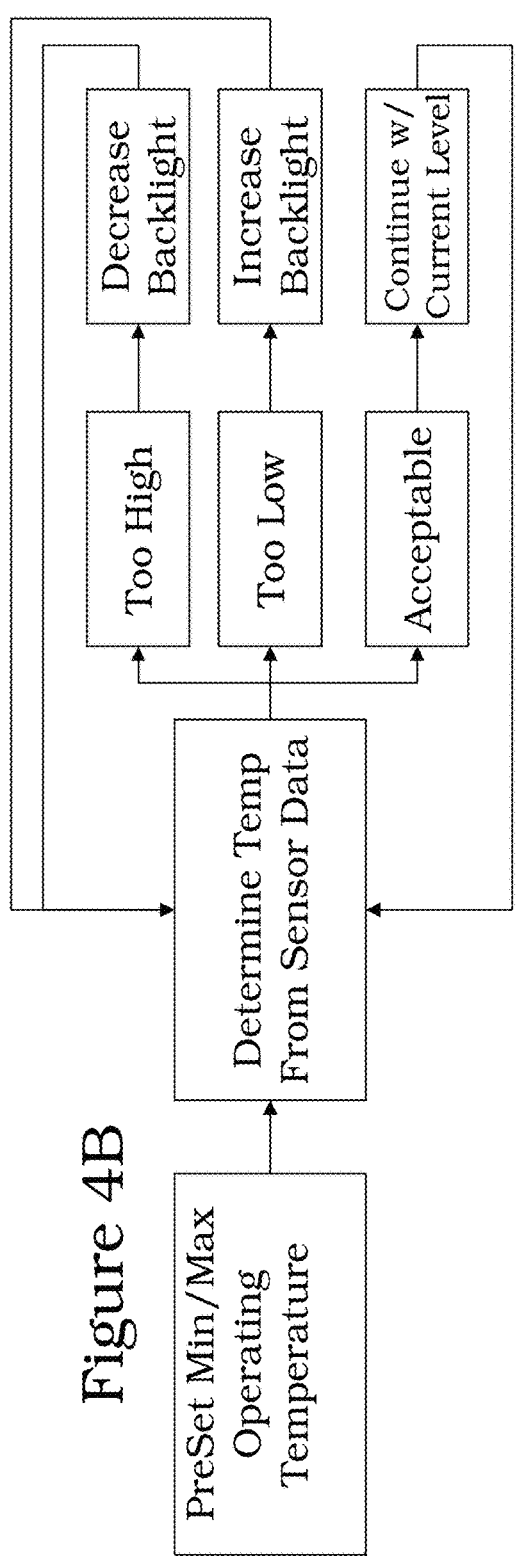

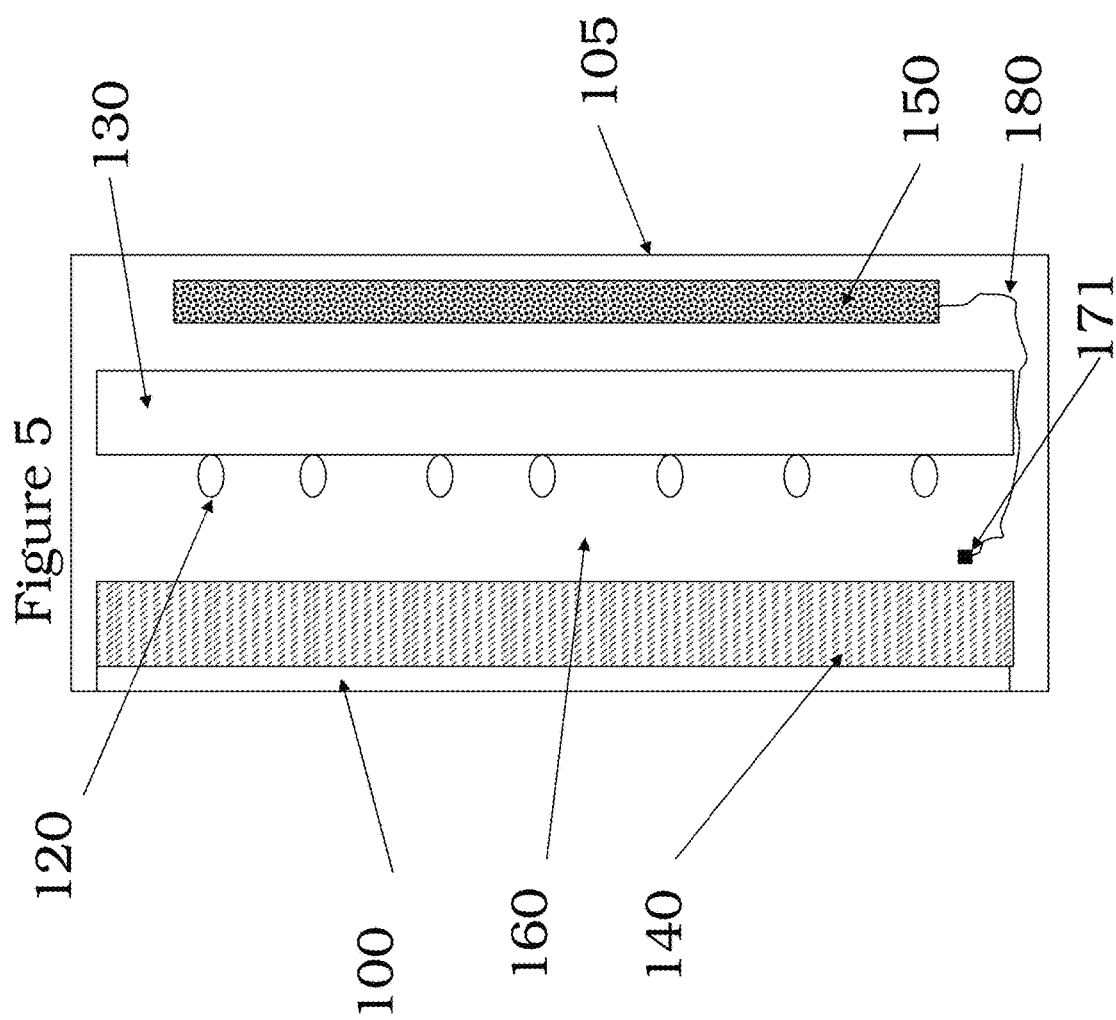

ELECTRONIC DISPLAY SYSTEM WITH ILLUMINATION CONTROL

CROSS-REFERENCE TO RELATED APPLICATIONS

This application is a continuation of U.S. application Ser. No. 14/884,479 filed on Oct. 15, 2015, which is a continuation of U.S. application Ser. No. 14/709,045 filed on May 11, 2015 and now issued U.S. Pat. No. 9,167,655, which is a continuation of U.S. application Ser. No. 14/447,164 filed on Jul. 30, 2014 and now issued U.S. Pat. No. 9,030,129, which is a continuation of U.S. application Ser. No. 13/353,371 filed on Jan. 19, 2012 and now issued U.S. Pat. No. 8,829,815, which is a continuation of U.S. application Ser. No. 12/124,741 filed on May 21, 2008 and now issued U.S. Pat. No. 8,125,163. All of said prior applications are incorporated by reference in their entirety as if fully set forth herein.

TECHNICAL FIELD

Exemplary embodiments described herein are directed to illumination control systems and methods for electronic displays, such as advanced electronic displays.

BACKGROUND

Traditionally, advanced electronic display systems have only been used for indoor applications, or outdoor applications where the variation in temperature and/or amount of direct sunlight is limited. When these systems are moved outside, both elements become significant factors in the display's ability to accurately recreate an image.

Cold is especially harmful to liquid crystal display (LCD) systems where the crystals can actually freeze. Heat is also harmful to many electronic displays as the electrical components which drive the display system may overheat and malfunction. Further, direct sunlight can limit the visibility of the display, as the reflection of the sun off of the viewing surface may be brighter than the light which is generated by the display. Direct sunlight can also heat the display, contributing to the overheating of electrical components or possible damage to liquid crystals in LCD applications.

SUMMARY

Exemplary embodiments include a system and method for controlling the illumination of an electronic display based on temperature and/or luminance measurements. Electronic displays typically contain some type of light source in order to generate an image on the display screen. This light source is often referred to as the display's backlight or edgelight. Sometimes, fluorescent bulbs may be used or more preferably, light emitting diodes (LED). A backlight system using LED's is disclosed in U.S. Pat. No. 7,052,152, herein incorporated by reference.

The amount of light that is required from a display backlight is dependent upon the amount of ambient light that is coming from the surrounding environment. For example, when the surrounding environment is very bright, a large amount of light is required from the backlight, as this light must overcome the bright light which is in the environment and is reflecting off the display surface. In contrast, when the surrounding environment is very dark, only a small amount of light is required from the backlight, as the display's light does not have to compete with a bright ambient light.

For indoor display applications, the variance is amount of backlight may be relatively low, as the amount of light inside a room may vary only a small amount. However, when electronic displays are used outdoors, the amount of ambient light can vary drastically. The ambient light that is surrounding the display can vary anywhere from completely dark at night, to being in direct sunlight during the day. These concerns are amplified for advanced displays which are designed to produce high quality, bright images with sharp contrast. Thus, in an exemplary embodiment the backlight of an electronic display is controlled, depending at least upon the amount of ambient light.

Some sources of backlighting degrade over time. For example, LED's may degrade over time and emit less light. Exemplary embodiments also allow for the brightness of a display to adjust based on the degradation of the light source.

Also for indoor applications, the temperature that an electronic display is subjected to will also vary only a small amount. Typically, these displays only see a range of temperatures near room temperature (ex. 65-75 degrees Fahrenheit). However, for outdoor applications, displays will see a very wide range of temperatures. These displays may see temperatures ranging from well below freezing to well over 100 degrees Fahrenheit.

The electronic display backlight is also a significant source of heat for the display. As mentioned above, too much heat or too little heat can also damage or destroy an electronic display. Again, this is especially a problem for large advanced displays, as these devices typically are required to produce bright, clear images. The amount of light that is required, typically forces the backlighting assembly to produce a large amount of light, which typically produces a large amount of heat. Thus, exemplary embodiments also control the level of the display backlighting based on the temperature of the air within the backlight cavity.

The foregoing and other features and advantages of the present invention will be apparent from the following more detailed description of the particular embodiments, as illustrated in the accompanying drawings.

BRIEF DESCRIPTION OF THE DRAWINGS

A better understanding of an exemplary embodiment will be obtained from a reading of the following detailed description and the accompanying drawings wherein identical reference characters refer to identical parts and in which:

FIG. 4A is a flow chart showing illumination control logic based on the amount of ambient light present;

FIG. 4B is a flow chart showing illumination control logic based on the temperature within a system housing;

FIG. 5 is a transparent side view of another exemplary electronic display system having only temperature related control components.

DETAILED DESCRIPTION

Exemplary embodiments include a system and method for controlling the illumination of an electronic display based on temperature and/or luminance measurements.

Figure 1:
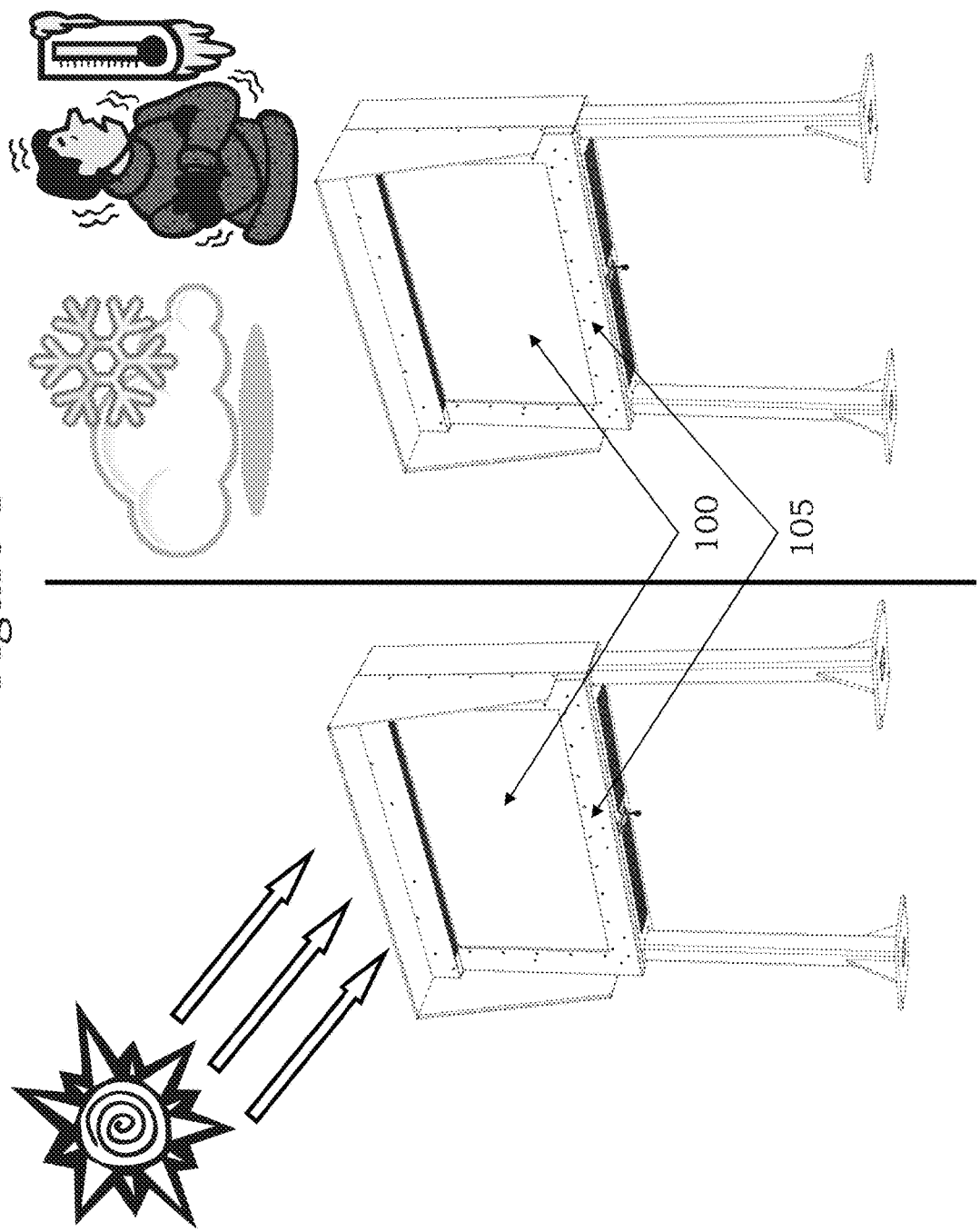
FIG. 1 is a perspective view of an exemplary electronic display system.

FIG. 1 shows an exemplary outdoor display which could be subjected to high levels of both heat and cold. The viewing surface 100 is contained within the display housing 105.

Figure 2:
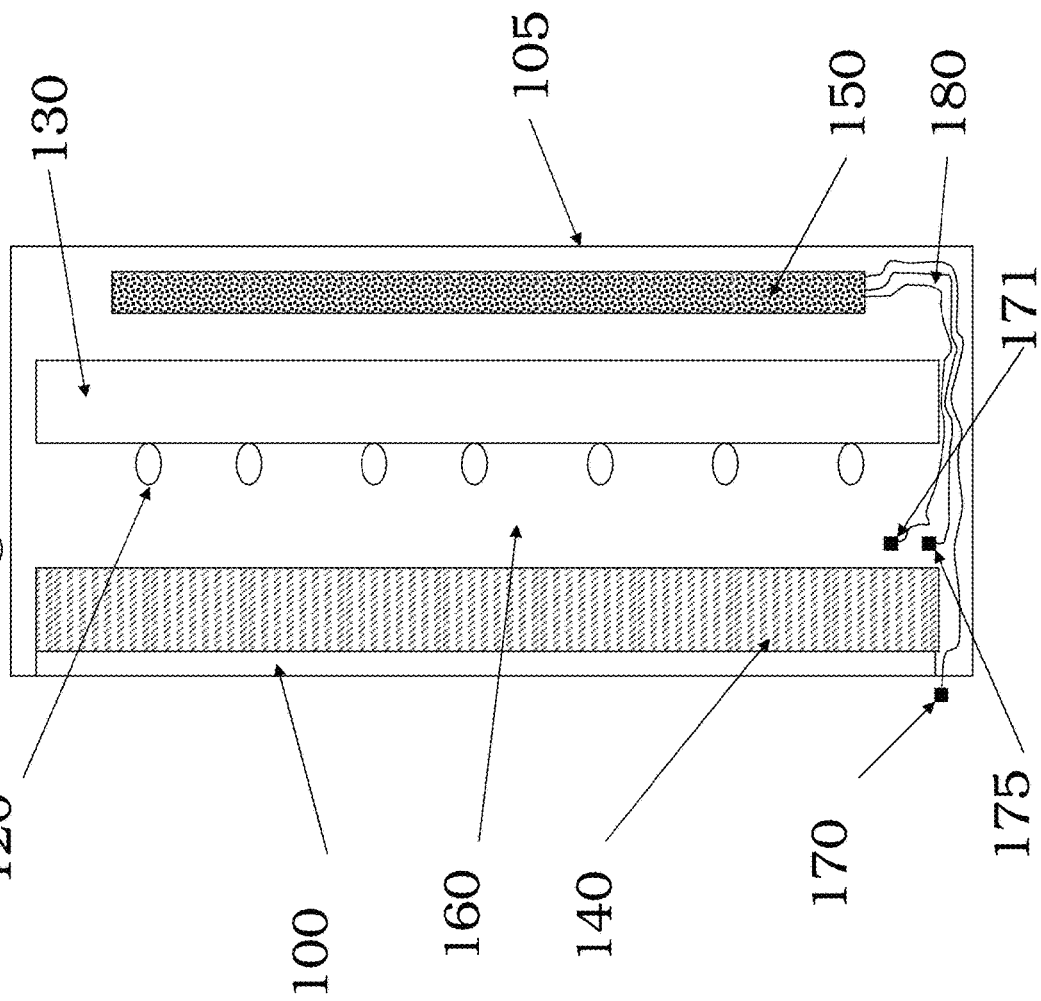
FIG. 2 is a transparent side view of an exemplary electronic display system having both ambient light and temperature related control components.

FIG. 2 shows further details about the electronic display and its associated components. The display housing 105 may contain all of the associated components. The viewing surface 100 is again found on the front of the display housing 105.

Towards the back of the display housing 105 are the electrical devices 150, which run the display. These devices may include: motors, circuit boards, resistors, capacitors, wiring, electronic chips, heating/cooling elements, fans, and power sources. In front of the electrical devices 150 of this embodiment is the backlight panel 130 and the backlight 120. In this exemplary embodiment, the backlight 120 comprises LED's, but any form of illumination will still fall within the scope of the invention. The backlight panel 130 provides a mounting surface for the LED's. The backlight panel 130 may also contain a highly reflective front surface so that the maximum amount of light from the LED's can pass through the viewing surface 100.

Between the backlight 120 and the viewing assembly 140 is the backlight cavity 160. The dimensions of the backlight cavity 160 are typically a function of the number of backlight LED's 120 and their luminance, size of the viewing surface 100, and the properties of the viewing assembly 140. The viewing assembly 140 may contain a variety of elements which are used to generate an image upon the viewing surface 100. In an LCD display for example, the viewing assembly 140 may contain a light diffuser, light reflector, several layers of polarizing glass, and a liquid crystal assembly. The precise elements and their arrangement will vary depending on the specific electronic display device being used and its particular application.

In an exemplary embodiment, an ambient light sensor 170 may be located outside of the display housing 105 and in front of, but not blocking the display surface 100. This ambient light sensor 170 measures the amount of light that is contacting the front surface of the display housing 105. Although shown at the base of the display in FIG. 2, the ambient light sensor 170 can be placed anywhere the sensor can measure the light contacting the front of the display housing 105, and near the display surface 100.

A backlight sensor 171 may be placed within the backlight cavity 160, and measures the amount of light that is being emitted by the backlight 120. The backlight sensor 171 can be placed anywhere within the backlight cavity 160, but preferably should be oriented so that it does not block any significant amount of light from entering the viewing assembly 140.

Further in this exemplary embodiment, a temperature sensor 175 may be located within the backlight cavity 160. This temperature sensor 175 also can be located anywhere within the backlight cavity 160 or anywhere inside the display housing 105, but preferably should be oriented so that it does not block any significant amount of light from entering the viewing assembly 140. The wiring 180 for the three sensors is shown at the base of the display housing 105 and running back to the electronic devices 150. The wiring 180 can be oriented in a number of ways, with or without separate connectors, as is common for one skilled in the art.

Figure 3:
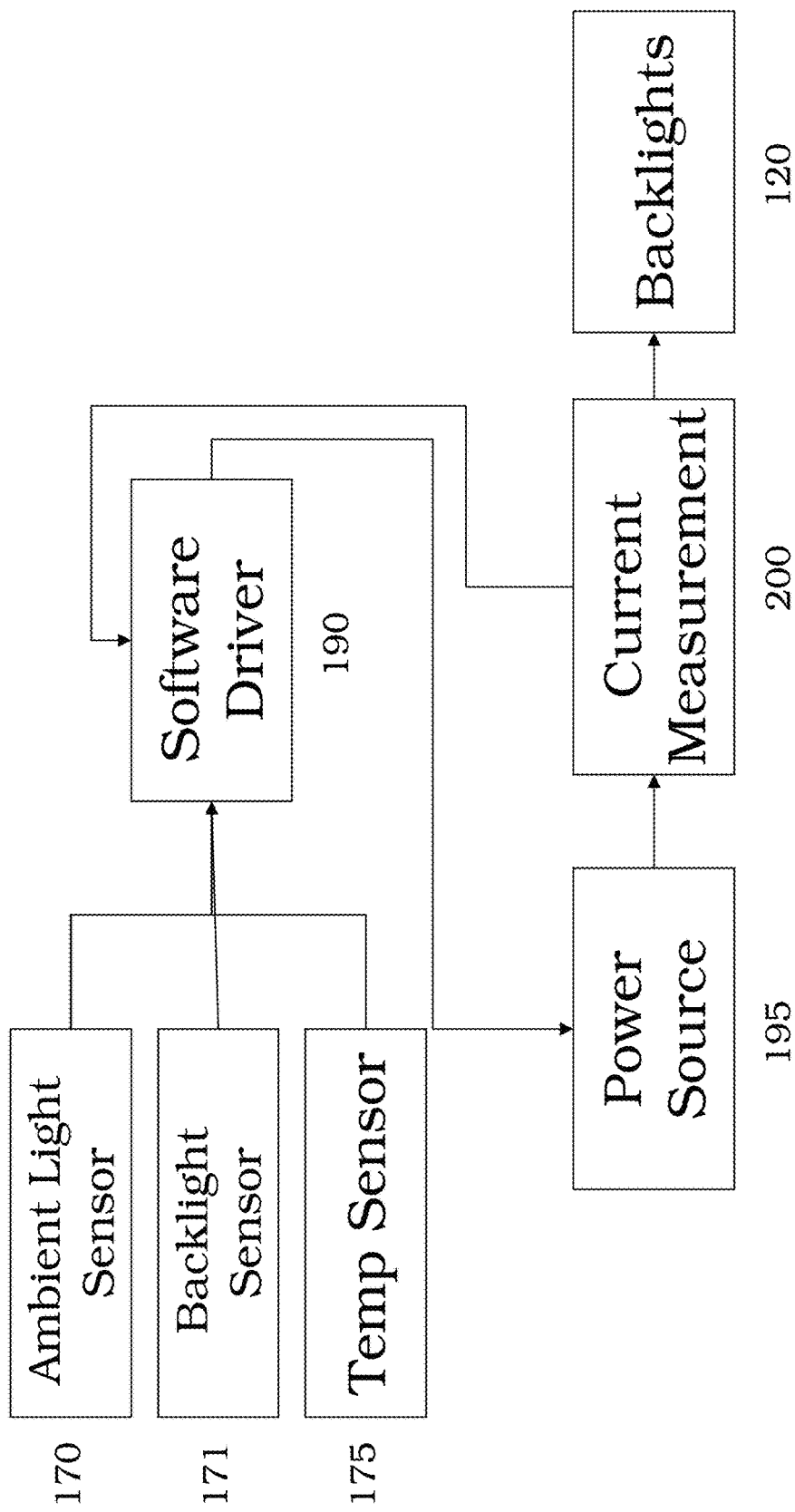
FIG. 3 is a schematic diagram indicating the interconnection of the components of the exemplary embodiment of FIG. 2.

FIG. 3 shows an exemplary embodiment with associated components and their connectivity. Data from the ambient light sensor 170, backlight sensor 171, and temperature sensor 175 flows into the software driver 190. The software driver 190 may be any commercially available control system or microcontroller. Preferably, the software driver 190 comprises an $e^2$prom (or eeprom), which is commercially available from Digi-Key (www.digi-key.com). The logic for the software driver is discussed below, under FIGS. 4A and 4B.

The software driver 190 decides how much power to send to the backlight 120. The software driver 190 sends the data regarding the proper amount of power to the power source 195, which generates the proper amount of power. A current measurement device 200 may be used to measure the amount of power coming from the power source 195. This information is sent back to the software driver 190 and compared to the power data which was originally sent to the power source 195 in order to ensure that the proper amount of power was in fact sent to the backlight 120. If these values do not match, adjustments are made by the software driver 190. Although this embodiment shows a current measurement device, any type of power measurement device will suffice.

Finally, the power is sent to the backlight 120, where the amount of light generated is again measured by the backlight sensor 171. The data from the backlight sensor 171 is again sent to the software driver 190, along with the data from the ambient light sensor 170 and the temperature sensor 175 as the process is repeated.

FIG. 4A shows an exemplary embodiment for the logic contained in the software driver 190 for adjusting the backlight based on the amount of ambient light. Ideally, a preferred light ratio can be determined by comparing the amount of light in the ambient surroundings with the amount of light being generated in the backlight cavity 160. For most applications, the amount of backlight will need to be greater than the amount of ambient light to ensure that the display can be seen. Preferably, the ratio of ambient light to backlight should be less than one. (ex. Ratio=ambient light/backlight). However, the precise ratio can vary depending on the particular display, environment, and application.

After a preferred light ratio is selected, it is stored within the software driver 190. The light ratio will also likely have an acceptable range, such that there is an ideal ratio with a certain amount of tolerance which allows the measured ratio to drift above or below the ideal ratio, before any action is taken by the system. The software driver 190 then reads the data from the light sensors and calculates the current light ratio. If the ratio is outside of the accepted tolerance range, then the system takes action. If the ratio is too low (i.e. there is too much backlight for the amount of ambient light), the backlight is decreased. If the ratio is too high, the backlight is increased. If the ratio is within the accepted tolerance, the current power to the backlight is continued.

FIG. 4B shows an exemplary embodiment for the logic contained in the software driver 190 for adjusting the backlight based on the temperature in the backlight cavity 160. A preferred operating temperature can be selected for the display, which will take into account the type of display, application, and its environment. This preferred operating temperature would again have a tolerance, where there is a minimum acceptable temperature along with a maximum acceptable temperature. The software driver 190 determines the current temperature from the temperature sensor 175 and compares this value to the preset min/max operating temperature. If the present value is below the minimum, the backlighting is increased to facilitate the warming of the display. If the present value is above the maximum, the backlighting is decreased to facilitate the cooling of the display. If the present value is within the acceptable range, the present amount of power to the backlighting will be continued.

Using the amount of backlighting to facilitate the warming or cooling of an electronic display is very useful in applications where the display is exposed to a wide range of temperatures, especially high levels of cold or heat. For example, in an outdoor application where the temperature of the ambient air becomes very warm (and subsequently warms the temperature of the air in the backlight cavity 160) the display may become damaged if it continues to run. In typical displays, a thermostat will simply turn the display off to allow it to cool. However, where a display is used as an advertisement tool or for displaying important information, turning off the display will result in a lack of communication of any images whatsoever. Exemplary embodiments allow the display to simply dim itself slightly, to allow the unit to cool while still providing some visible image (albeit not as bright, but still visible).

This function also aids in protecting a display when the ambient air becomes very cold (and subsequently cools the air in the backlight cavity 160). Exemplary embodiments allow the display to increase the amount of backlighting, which will typically produce more heat, and subsequently heat the dangerously cool display.

The embodiments shown in FIGS. 2 and 3 allow the system to control the backlighting based on both the ambient light and the temperature in the backlight cavity. FIG. 5 shows another embodiment where the system controls the amount of backlighting based on the temperature in the backlight cavity, without regard to the amount of ambient light. This embodiment lacks the previous light sensors, but contains the temperature sensor 175.

Figure 6:
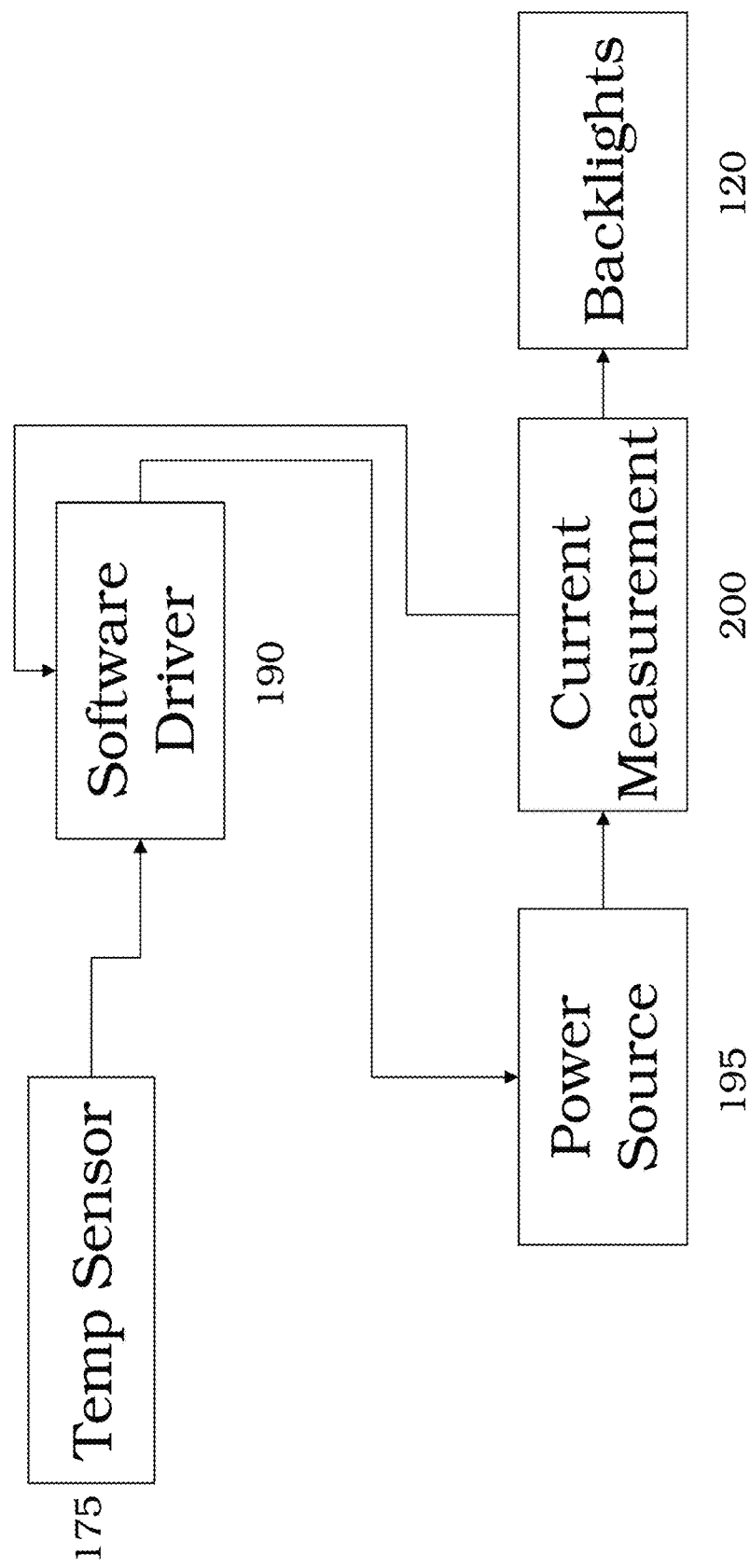
FIG. 6 is a schematic diagram indicating the interconnection of the components of the exemplary embodiment of FIG. 5.

FIG. 6 shows the various components for this embodiment, again lacking the light sensors but still containing the temp sensor 175, software driver 190, power source 195, current measurement 200 (optional), and backlight 120. As the embodiments in FIGS. 2 and 3 conduct the logic in both FIGS. 4A and 4B, the embodiments in FIGS. 5 and 6 would only conduct the logic in FIG. 4B.

It is to be understood that the spirit and scope of the disclosed embodiments are not limited to LCDs. By way of example and not by way of limitation, embodiments of the present invention may be used in conjunction with displays selected from among LCD (including TFT or STN type), light emitting diode (LED), organic light emitting diode (OLED), field emitting display (FED), and cathode ray tube (CRT). Furthermore, embodiments of the present invention may be used with displays of other types including those not yet discovered. In particular, it is contemplated that the present invention may be well suited for use with full color, flat panel advanced LCD displays. While the embodiments described herein are well suited for outdoor environments, they may also be appropriate for indoor applications (e.g., factory environments) where ambient light and thermal stability of the display may be at risk.

Having shown and described exemplary embodiments of the invention, those skilled in the art will realize that many variations and modifications may be made to affect the described invention and still lie within the scope of the claims. Additionally, many of the elements indicated above may be altered or replaced by different elements, which will provide the same result and fall within the spirit of the claimed invention. It is the intention, therefore, to limit the invention only as indicated by the scope of the claims.

What is claimed is:

1. An electronic display system with illumination control, comprising:
    a display housing;
    an electronic display with a viewing surface and an illumination means, the electronic display located at least partially within the housing;
    a power source in communication with the illumination means and configured to provide electrical energy thereto;
    a temperature sensor configured to measure the temperature within the housing; and
    a controller in communication with the temperature sensor and the power source, the controller:
        provided with an acceptable system operating temperature range,
        programmed to increase the light output of the illumination means by increasing the output of the power source when a temperature measurement from the temperature sensor is below the acceptable system operating temperature range, and
        programmed to decrease the light output of the illumination means by decreasing the output of the power source when a temperature measurement from the temperature sensor is above the acceptable system operating temperature range.

2. The system of claim 1, wherein the electronic display is selected from the group consisting of a backlit display, an edgelit display and an OLED display.

3. The system of claim 1, further comprising an electrical energy measurement device connected between the power source and the illumination means and operative to report the amount of electrical energy being supplied to the illumination means by the power source.

4. The system of claim 1, wherein the controller is also in communication with the electrical energy measurement device, and is operative to adjust the output of the power source based on readings from the electrical energy measurement device.

5. The system of claim 1, wherein the controller is pre-programmed with the acceptable system operating temperature range.

6. The system of claim 1, wherein the controller is configured to access a remote database and to obtain the acceptable system operating temperature range from the database.

7. An electronic display system with illumination control, comprising:
    a display housing;
    an electronic display with a viewing surface and an illumination means, the electronic display located at least partially within the housing;
    a power source in communication with the illumination means and configured to provide electrical energy thereto;
    a first light sensor configured and located to measure the ambient light level to which the viewing surface of the electronic display is being exposed;
    a second light sensor configured and located to measure the light output of the illumination means; and
    a controller in operative communication with the light sensors and the power source, the controller:
        provided with an acceptable light ratio range, the light ratio being the ratio of ambient light to light output, programmed to increase the light output of the illumination means by increasing the output of the power source when the light ratio is above the acceptable light ratio range, and programmed to decrease the light output of the illumination means by decreasing the output of the power source when the light ratio is below the acceptable light ratio range.

8. The system of claim 7, wherein the electronic display is selected from the group consisting of a backlit display, an edgelit display and an OLED display.

9. The system of claim 7, further comprising an electrical energy measurement device connected between the power source and the illumination means and operative to report the amount of electrical energy being supplied to the illumination means by the power source.

10. The system of claim 7, wherein the controller is also in communication with the electrical energy measurement device, and is operative to adjust the output of the power source based on readings from the electrical energy measurement device.

11. The system of claim 7, wherein the controller is pre-programmed with the acceptable light ratio range.

12. The system of claim 7, wherein the controller is configured to access a remote database and to obtain the acceptable light ratio range from the database.

13. The system of claim 7, wherein the controller is programmed to determine an acceptable light ratio range based on one or more parameters selected from the group consisting of the configuration of the electronic display, the environment in which the system resides, and the application in which the system is being used.

14. An electronic display system with illumination control, comprising:
- a display housing;
- an electronic display with a viewing surface and an illumination means, the electronic display located at least partially within the housing;
- a power source in communication with the illumination means and configured to provide electrical energy thereto;
- a temperature sensor configured to measure the temperature within the housing;
- a first light sensor configured and located to measure the ambient light level to which the viewing surface of the electronic display is being exposed;
- a second light sensor configured and located to measure the light output of the illumination means; and
- a controller in operative communication with the temperature sensor, the light sensors and the power source, the controller:
  provided with an acceptable system operating temperature range and an acceptable light ratio range, the light ratio being the ratio of ambient light to light output,
  programmed to increase the light output of the illumination means by increasing the output of the power source when a temperature measurement from the temperature sensor is below the acceptable system operating temperature range,
  programmed to decrease the light output of the illumination means by decreasing the output of the power source when a temperature measurement from the temperature sensor is above the acceptable system operating temperature range,
  programmed to increase the light output of the illumination means by increasing the output of the power source when the light ratio is above the acceptable light ratio range, and
  programmed to decrease the light output of the illumination means by decreasing the output of the power source when the light ratio is below the acceptable light ratio range.

15. The system of claim 14, wherein the electronic display is selected from the group consisting of a backlit display, an edgelit display and an OLED display.

16. The system of claim 14, further comprising an electrical energy measurement device connected between the power source and the illumination means and operative to report the amount of electrical energy being supplied to the illumination means by the power source.

17. The system of claim 14, wherein the controller is also in communication with the electrical energy measurement device, and is operative to adjust the output of the power source based on readings from the electrical energy measurement device.

18. The system of claim 14, wherein the controller is pre-programmed with the acceptable system operating temperature range and the acceptable light ratio range.

19. The system of claim 14, wherein the controller is configured to access a remote database and to obtain the acceptable system operating temperature range and the acceptable light ratio range from the database.

20. The system of claim 14, wherein the controller is programmed to determine an acceptable light ratio range based on one or more parameters selected from the group consisting of the configuration of the electronic display, the environment in which the system resides, and the application in which the system is being used.

* * * * *